(No Model.)

J. K. HARRIS.
BUTTON HOLE ATTACHMENT.

No. 318,471.  Patented May 26, 1885.

WITNESSES:
Dom Twitchell
C. Sedgwick

INVENTOR:
J. K. Harris
BY Munn & Co.
ATTORNEYS.

UNITED STATES PATENT OFFICE.

JOHN K. HARRIS, OF SPRINGFIELD, OHIO, ASSIGNOR TO THE HARRIS BUTTON HOLE ATTACHMENT COMPANY, OF NEW YORK, N. Y.

BUTTON-HOLE ATTACHMENT.

SPECIFICATION forming part of Letters Patent No. 318,471, dated May 26, 1885.

Application filed November 12, 1884. (No model.)

*To all whom it may concern:*

Be it known that I, JOHN K. HARRIS, of Springfield, in the county of Clark and State of Ohio, have invented a new and useful Improvement in Button-Hole Attachments, of which the following is a full, clear, and exact description.

My invention relates to button-hole attachments for sewing-machines.

The present invention is an improvement on the devices shown in Letters Patent granted to me December 7, 1880, No. 235,235, and September 6, 1881, No. 246,765, in those devices the longitudinal feed movement produced by a pinion working alternately with two straight and parallel racks brought into gear on opposite sides of the pinion by hand, thus giving the forward and backward motion to the vibrating feed-bar for working both sides of the button-hole. I now close the ends of these racks by semicircular continuations, thus producing an endless or continuous gear, which is held into engagement with the pinion by a guide-piece, and one end of the gear is made adjustable for varying the length to suit the length of the button-hole desired, all as hereinafter described and claimed.

Reference is to be had to the accompanying drawings, forming part of this specification, in which similar letters of reference indicate corresponding parts in all the figures.

Figure 1:
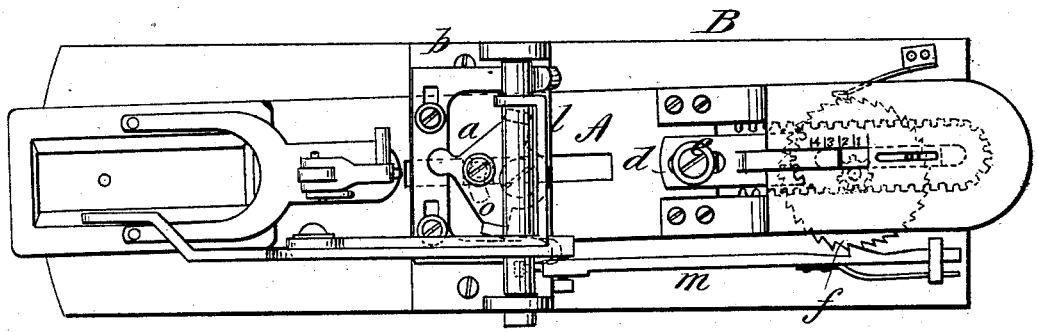
Figure 2:
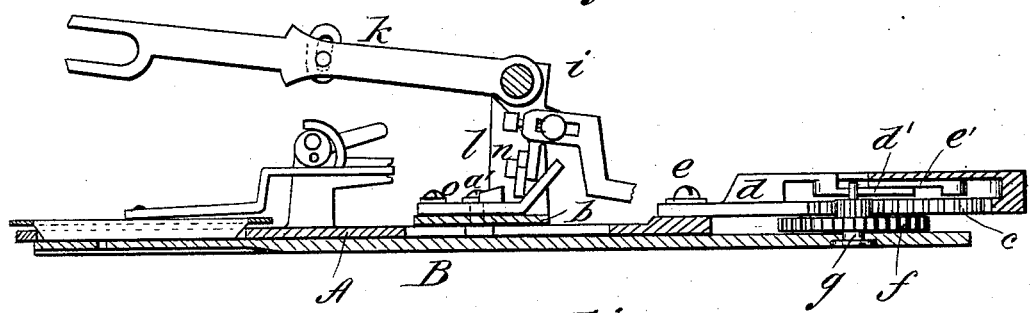
Figure 3:
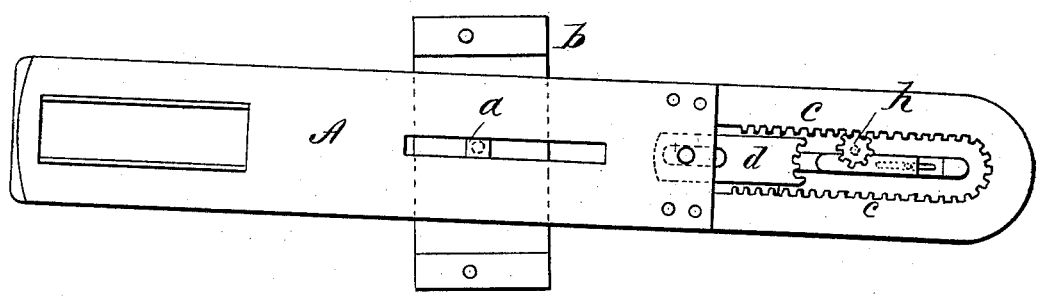
Figure 4:
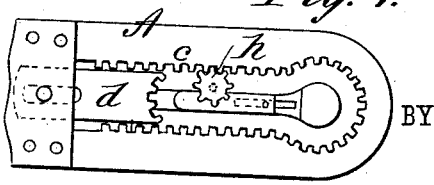

Figure 1 is a plan view of the attachment. Fig. 2 is a longitudinal section of the same. Fig. 3 is an inverted plan view of the vibrating feed-bar, and Fig. 4 shows a modification in the form of the rack.

The vibrating feed bar or plate A is hung at its mid-length on a working-stud, $a$, at the under side of a bridge, $b$, which is attached to the main plate B, and the feed-plate is slotted to receive the stud $a$, so as to permit both endwise and vibrating movement.

On plate A, at one end, are the clamps of usual character for holding the material, and at the other end the plate is slotted, and the sides of the slot are toothed to form the rack $c$, which is continuous and of semicircular form at the outer end of the slot. The rack is also made practically continuous at the inner end by the piece $d$, attached to plate A by a screw, $e$, which passes through a slot in piece $d$, whereby the latter can be set up in the slot to shorten or lengthen the rack. $f$ is a ratchet-wheel on a stud, $g$, that rises from plate B, and $h$ is a pinion on the ratchet-wheel in the plane of the rack $c$. The piece $d$, forming one end of the rack, is formed with a guide-tongue, $d'$, and a similar guide piece or tongue, $e'$, projects from the outer end of the rack, and the two tongues form a continuous guide for the upward projecting end of stud $g$, whereby the rack is caused to engage the pinion at all times.

On the bridge $b$ are standards $i$, on which is hung the operating-lever $k$, that has a downwardly-projecting portion, $l$, and to the pendant $l$ is connected a pawl-arm, $m$, that extends into connection with ratchet-wheel $f$. The device for vibrating plate A by movement of lever $k$, consisting of rocker $n$ and the lever $o$, that is hung on pivot-stud $a'$, are the same as shown in the Letters Patent aforesaid, and act to move the plate A. The feed bar or plate A being vibrated by operation of lever $k$, and the pinion also given an intermittent rotation by the pawl, it is plain that the feed-bar will also be moved endwise and given all the motions necessary for working the button-hole. If an eyelet button-hole is required, the rack and guides will be formed to give the required feed, as shown in Fig. 4, and in either form of button-hole the operation is performed automatically without turning the goods.

Having thus described my invention, what I claim as new, and desire to secure by Letters Patent, is—

1. In a button-hole attachment for sewing-machines, the combination, with an oscillating and longitudinally-movable feed-bar pivoted near its center and provided at its forward end with a cloth-clamp, and at its rear end with a continuous rack, both ends of which are rounded, of an intermittingly-rotated pinion, a guide for retaining the latter in continuous gear with said rack, and mechanism for operating said pinion, substantially as set forth.

2. In a button-hole attachment for sewing-machines, the combination, with a cloth-clamp, of a feed plate or bar therefor provided with a continuous adjustable or extensible rack having semicircular or rounded ends, an intermittingly-rotating pinion, an adjustable or extensible guide for retaining the latter in gear with the said rack, and mechanism for operating said pinion, substantially as set forth.

3. In a button-hole attachment for sewing-machines, the combination, with an oscillating and longitudinally-movable feed-bar carrying a cloth-clamp at its forward end, and provided at its rear end with a continuous adjustable or extensible rack having rounded ends, an intermittingly-rotated pinion, an adjustable or extensible guide for the pinion, stud, and mechanism for operating said pinion, whereby fabrics may be automatically moved to entirely work different-sized button-holes without turning the goods or cloth-clamp bodily around the vertical line in which the needle reciprocates, substantially as set forth.

JOHN K. HARRIS.

Witnesses:
GEO. D. WALKER,
EDWD. M. CLARK.